United States Patent Office.

ENOCH WAITE, OF FRANKLIN, MASSACHUSETTS.

Letters Patent No. 107,642, dated September 20, 1870.

IMPROVEMENT IN FABRICS FOR THE MANUFACTURE OF SHOES, &c.

The Schedule referred to in these Letters Patent and making part of the same.

*To all persons to whom these presents may come:*

Be it known that I, ENOCH WAITE, of Franklin, of the county of Norfolk and State of Massachusetts, have made a new and useful invention of a new Fabric, and a mode of making such, and of converting it into a shoe or boot, or other article, in whole or in part, and I do hereby declare the same to be fully described as follows:

The said fabric is to be composed of wool, or like material, capable of being felted, and one or more other fibrous materials, such as buckskin or leather scraps, such as will combine or connect with the wool.

In making the fabric I usually take about sixty pounds of wool and forty pounds of buckskin, or the scraps thereof, as usually made by glovers in cutting buckskin, to be made into gloves. These substances I put into a paper-pulp grinder, and by such reduce the whole with water to a pulpy state, after which the pulp so formed is to be run through a paper-making machine, and, by such, be reduced to a sheet or sheets, as paper or paper-board is usually made. Next, while the sheet so formed is in a wet state, it is to be subjected to the action of a felting-machine, so as to felt the fibers of wool, the felting being effected as cloth is usually felted; or, instead of felting the sheet, it may be subjected to the action of a fulling-mill, in order to full the fibers.

Sometimes I apply to either or each of the sides of the sheet, before felting it, one or more thin layers of wool, and felt or full the whole together.

This completes the fabric. To form it into a shoe-upper or other article, it, while wet or moist, is to be pressed on or into a mold, suitably constructed, for giving to the material the necessary shape, and heat is to be employed in or applied to the mold, so as to either wholly or partially dry the molded article while therein.

By such a mode of operating, shoe or boot-uppers, and various other articles may be manufactured to great advantage. Such shoe-uppers, after being made, may be soled in any well-known suitable manner.

I claim as of my invention—

1. The new article of manufacture or fabric, made substantially as described.

2. The process herein set forth of making the said new fabric.

3. A shoe-upper, or other articles, as made of such new fabric, in a wet state, and by means of a mold and heat and pressure, as set forth.

ENOCH WAITE.

Witnesses:
R. H. EDDY,
S. N. PIPER.